Oct. 20, 1931.　　　L. A. LAAS　　　1,828,670
AGRICULTURAL APPARATUS
Filed Aug. 15, 1930　　2 Sheets-Sheet 1
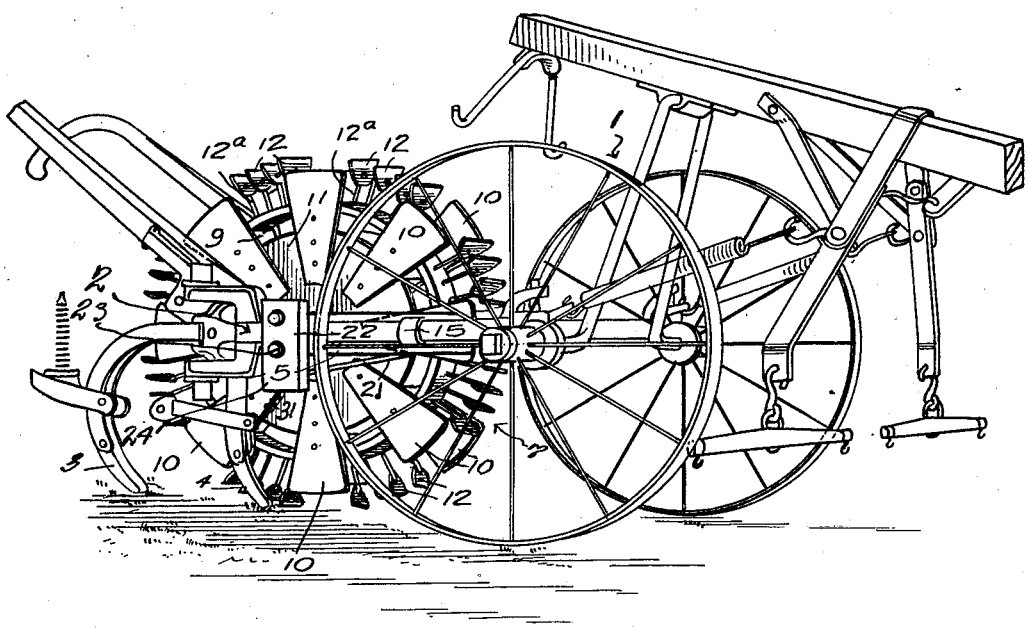
Inventor
LOUIS A LAAS Oct. 20, 1931.  L. A. LAAS  1,828,670
AGRICULTURAL APPARATUS
Filed Aug. 15, 1930   2 Sheets-Sheet 2
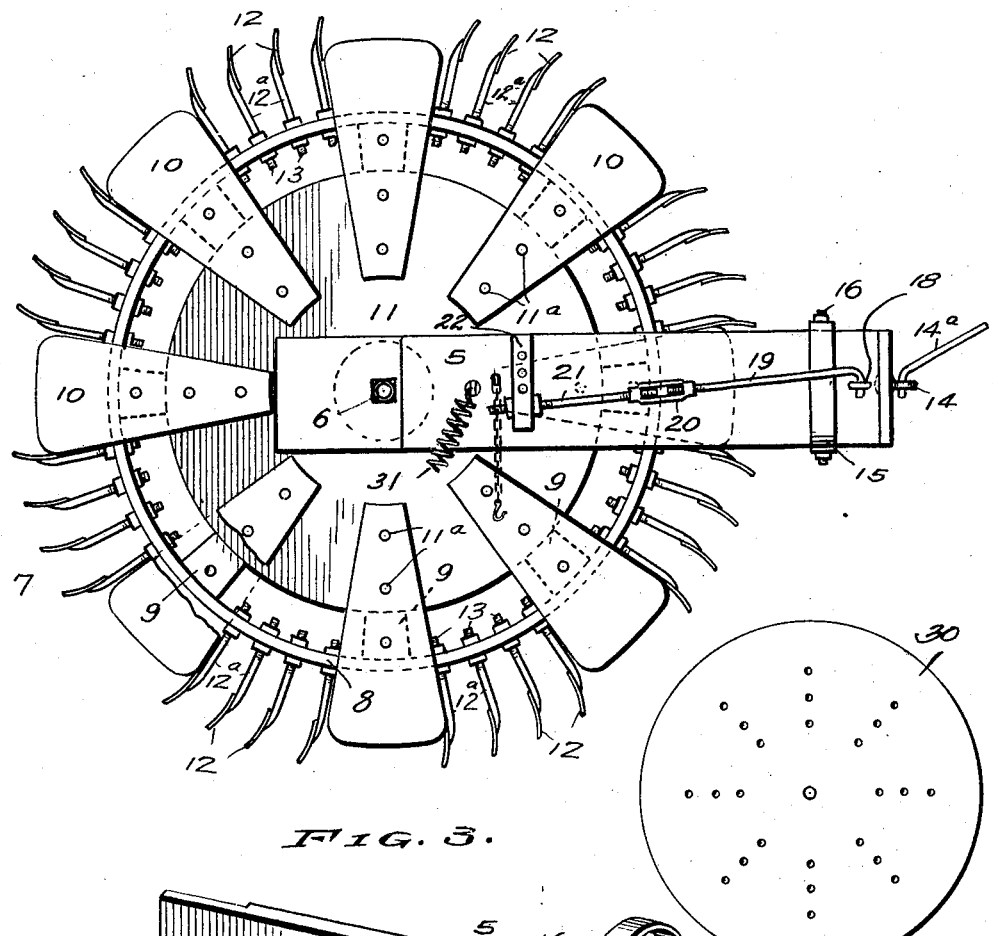
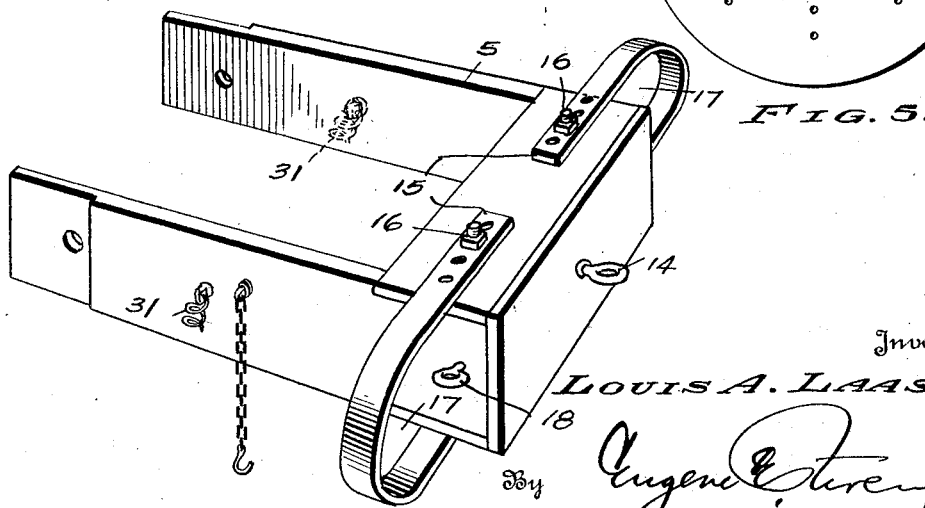
Inventor
LOUIS A. LAAS Patented Oct. 20, 1931

1,828,670

UNITED STATES PATENT OFFICE

LOUIS AUGUST LAAS, OF MAXWELL, TEXAS, ASSIGNOR OF ONE-HALF TO HERM. CONRADS, OF CALDWELL COUNTY, TEXAS

AGRICULTURAL APPARATUS

Application filed August 15, 1930. Serial No. 475,613.

My invention relates to improvements in agricultural implements, and particularly in such as are used in cultivating growing plants,—the invention in its more limited adaptation relating to an attachment for cultivators which is particularly designed for chopping or thinning out a row of plants such as cotton.

Briefly stated,—the invention has for one of its primary objects to provide an attachment which can be readily applied to standard types of cultivators,—which attachment is adapted to thin out rows of plants at the same time the plants are being cultivated,—in this way saving considerable labor and saving the farmer the cost of a special machine for chopping out or cutting out surplus plants in a row.

Another object of the invention is to provide a cultivator which,—has interchangeable parts adapting the apparatus for chopping out surplus plants from a row and protecting the plants during cultivation when no chopping is desired.

Another object of the invention is to provide a cultivator attachment which not only chops out to a practical stand a row of cotton or other plants, but also chops out weeds and the like, thus, preventing the same from getting substantial headway and materially reducing the cost of production, especially when labor is scarce and wages high.

Still another object of the invention is to provide a device of this character which incorporates novel means for attachment to a cultivator and in addition includes adjustable parts so that attachment can be made to different types of cultivators,—there being further provided a draft means for the attachment which is adapted to be connected to the cultivator at or near the draft bar thereof.

The invention also resides in certain novel features of construction, combination and arrangement of the various parts, and in certain modes of operation all of which will be readily understood and appreciated by those skilled in the art upon reference to the accompanying drawings in connection with the detailed descriptive matter appearing hereinafter.

In the drawings,

Figure 1 is a perspective view of a cultivator illustrating the attachment of my cotton chopper thereto;

Figure 2 is a plan view of the frame which carries the chopper wheel;

Figure 3 is a perspective view of the chopper wheel carrying frame and showing particularly guide bands for embracing the frame bars of the cultivator;

Figure 4 is a partly broken side elevational view showing the attachment;

Figure 5 is a side elevational view of an attachment for the chopper wheel which may be used at each side of the wheel in addition to, or in lieu of the spokes 10 when cultivating to protect the plants from the soil.

Referring specifically to the drawings wherein the same reference characters have been used to designate the same parts in all views, numeral 1 denotes generally a cultivator of familiar form having the usual rearwardly extending spaced parallel bars 2 carrying the rear shovels 3 and the forwardly disposed shovels 4.

Numeral 5 denotes a U-shaped frame which carries by attachment and which is adapted to be disposed between the parallel rear frame bars 2 of the cultivator.

U-shaped frame 5 receives the shaft 6 and passes through the hub hole of the wheel 7 having the felly 8 supported by lugs 9 carried by spokes 10 secured to the disk-like hub portion 11 through which said shaft 6 extends.

Figure 4 shows very clearly that the felly or rim portions 8 carries the shank 12a of the cutter blades 12,—the said shanks 12a being adjustably secured to the rim or felly 8 by means of nuts 13. It is particularly to be observed that the cutter blades 12 are disposed diagonally so as to shear off or chop down surplus plants in a row.

The form of the spokes 10 deserves particular attention, it being noted that the same increase in width in the direction of their outer ends so as to provide not only a support for the wheel beyond the felly 9, but also to provide a space between the chopping blade 12, such space accommodating the unchopped plants of the row and protecting the same. Thus, the spacing of the plants left in the row may be accurately determined by the spacing between the spokes 10.

Of course, there are spokes 10 at each side of the disk 11 and lock 9.

The bight portion of the attachment frame 5 carries an adjustable eye-bolt 14 to which the draft connection 14a may be attached and secured to the cultivator frame in advance of the rearwardly extending parallel bars 2 thereof, as for instance to the draft bar of the cultivator. Thus, the member 14a provides a draft connection for the cultivator attachment, as will be manifest, and relieves the hereinafter described members of the attachment which are clamped to the bars 2 from the draft strain.

In carrying out the invention the bight portion of the attachment frame 5 is provided with the lateral straps 15 bolted to the top and bottom of such bight portion by means of bolts 16 and providing guide loops 17 at each side to embrace and receive the rearwardly extending bars 2 of the cultivator.

Figure 4 shows very clearly that each end of the bight portion of the attachment frame 5 is provided with an eye bolt 18 in which is secured the hook rod 19 having the turnbuckle 20 with the rod 21 carrying the clamp member 22 which is adapted to be bolted as at 23 to the rear side frame members 2 of the cultivator.

From the foregoing description, it will be manifest that a very simple, rigid, durable and satisfactory attachment is provided for cultivators. The mode of attachment will be manifest. First the attachment frame will be disposed between the rearwardly extending frame members 2 of the cultivator and the draft connection 14a connected to the cultivator. Then the guide straps 15 will be put in place to tightly embrace the rear bars 2 of the cultivator. After that the clamp element 22 will be applied to rear bars 2 of the cultivator. These clamp elements may be in the nature of U bolts carried by a block 24. Of course, there is a clamp element 22 at each side of the cultivator frame.

As indicated, the bolts 11a serve to attach the spokes 10 to the disks 11 and blocks 9.

These self same bolts may be availed of for attaching the metal disks 30 to each side of the wheel 7,—which disks will engage the ground at each side of a row of plants so as to protect the same during cultivation. Obviously, the disks 30 can be used for protecting the plants whether the blades are used or not and also whether the spokes 10 are used or not. The spokes 10 only protect the plants which are left standing after the chopping process. The disks 30, however, can be used to cultivate a row of plants that have already been thinned out by the chopper. In this latter case the knives or blades 12 would be detached, and the disks 30 used to protect the plants during cultivation.

Numeral 31 designates coil springs adapted to be attached to the forward plow elements 3 so as to tension the frame 5 toward the ground. However the weight of the wheel is ordinarily sufficient to carry out the chopping process. The use of the coil springs 31 assures of positive engagement of the blades with the row of plants.

The blades 12 may, of course, be adjusted to any angle by means of the nuts 13 on the shanks 12a. In practical use the blades will preferably be set diagonally of the rim portion of the wheel. Different conditions will determine the most desirable adjustment of blades 12. When set diagonally they produce a shearing cut which is very effective in chopping out vegetation.

The chains 40 shown in Figures 3 and 4 may be looped around the cultivator beams shown in Figure 1 for the purpose of raising the chopper off the ground when turning at the end of a row or while going to and from the field when the chopper is not in use.

Having thus described my invention, what I claim as new, and desire to secure by Letters Patent is:

1. An attachment for cultivators comprising a V-shaped frame, a wheel journalled in said frame and comprising a disk-like hub, a rim-like felly arranged about said hub and radially spaced therefrom, platelike spokes carried by said hub, cleat members carried by said spokes and supporting said rim, diagonally disposed chopping blades having shanks adjustably mounted in said rim, said blades extending beyond the ends of said spokes, there being a gap at a number of points in the series of blades opposite said spokes, a draft bar detachably connected to the bight portion of said frame, guide straps extending laterally of the bight portion of said frame and adapted to embrace the frame bars of a cultivator, turnbuckle rods swingably connected to the side portion of the frame member bight portion, and clamp members carried at the ends of said turnbuckle rods and adapted to embrace the side bars of the cultivator frame.

2. An attachment for cultivators comprising a V-shaped frame, a wheel journalled in said frame, a rim-like felly arranged about the wheel, cleat members radially spacing the felly from the wheel, platelike spokes carried by the wheel and extending radially beyond the felly, diagonally disposed chopping blades adjustably mounted on the felly between adjacent circumferentially spaced spokes, a draft bar detachably connected to bight portion of the frame, straps carried by the frame and embracing the implement beams of the cultivator, and adjustable members swingably connecting the frame and the implement beams.

3. An attachment for cultivators comprising a V-shaped frame, a wheel journalled in the frame, a rim-like felly arranged about the wheel, members spacing the felly from the wheel, platelike spokes carried by the wheel and extending beyond the felly, chopping blades mounted on the felly between the circumferentially spaced spokes, draft means secured to the frame, and bracing members connecting the frame and the implement beams.

In testimony whereof I affix my signature.

LOUIS AUGUST LAAS.